Figure 1:
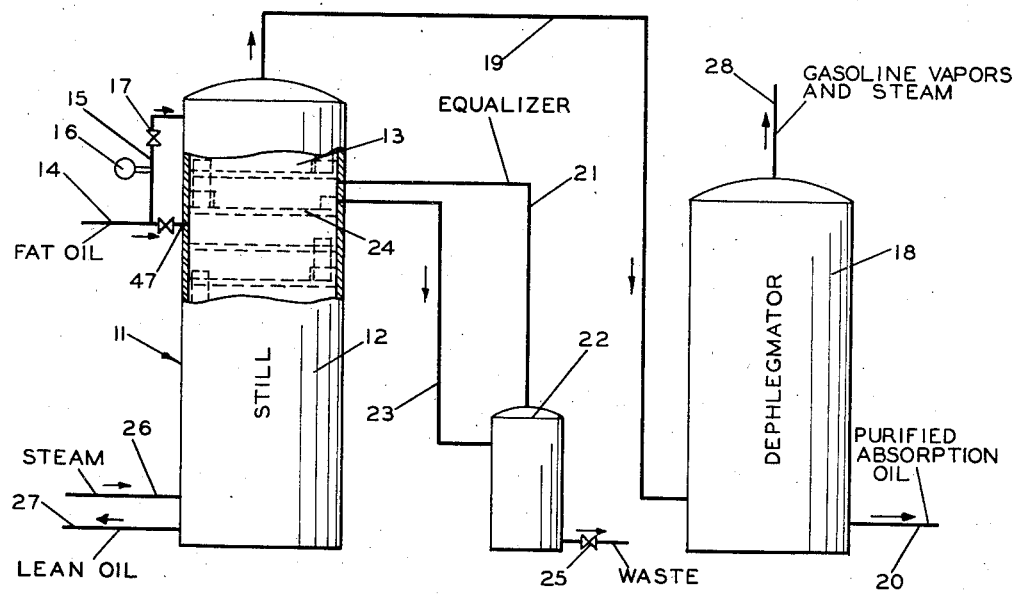

July 11, 1944.                C. O. MEYERS                2,353,176
               ABSORPTION OIL DISTILLATION PURIFIER
                       Filed April 17, 1943

INVENTOR.
C.O. MEYERS

BY
Hudson, Young & Yinger
ATTORNEYS.

Patented July 11, 1944

2,353,176

UNITED STATES PATENT OFFICE 2,353,176

ABSORPTION OIL DISTILLATION PURIFIER

Charles O. Meyers, Bartlesville, Okla., assignor to Phillips Petroleum Company, a corporation of Delaware Application April 17, 1943, Serial No. 483,426

4 Claims. (Cl. 196—8)

This invention relates to a process for the purification of absorption oils and more particularly it relates to a method for the purification of absorption oils by the continuous distillation of a small fraction of the impure oil during the enriched absorption oil stripping operation.

In conventional natural gasoline absorption systems, the solvent commonly used is a petroleum oil having an initial boiling point of about 350° F. and a final boiling point of about 450° F. In low pressure gasoline absorption plants about 30 to 40 gallons of absorption oil is circulated per 1000 cubic feet of gas treated, and it is not unusual for the entire charge of absorption oil in the operating cycle to be recirculated as many as one hundred times per day. By this cyclic movement of the oil, which includes its repeated contact with gas containing at times dust, hydrogen sulfide, crude oil spray, carbon dioxide, air, etc., and in the stripping still with steam containing air and frequently entrained inorganic matter, the oil becomes contaminated. The presence of some or all of the materials mentioned, together with the frequent heating and cooling causes chemical changes in the oil itself. These impurities lead to the formation within the oil of high boiling bodies, the result of oxidation and other reactions as well as the accumulation of extraneous impurities.

Probably the most harmful of such accumulations are the chemical products of the oil itself. These materials are soluble in the oil up to a certain point and when this point or saturation is reached, such materials having the nature of varnish or tar, are deposited in such parts of the system as heat exchangers and coolers. By forming a film on these cooling or heating surfaces, the heat exchange efficiency is materially lowered.

Attempts have been made to purify absorption oils by such processes as sedimentation in a surge tank, or treatment by centrifuge. Later distillation by fire and steam or other stripping gas was used, and in principle the distillation was a marked improvement over the earlier mechanical methods.

One of the earlier distillation methods was to distill the entire body of contaminated oil at intervals. This method was efficient, that is, the oil was well purified since it was an overhead condensate, but was uneconomical since the absorption plant must be closed down for this distillation step. The art was materially advanced when a process was introduced for bypassing a small portion of the lean absorption oil stream to a separate and distinct distillation unit in which the relatively small amount of impure absorption oil was continuously distilled as an overhead product. In this process a heater was required to raise the absorption oil to the distillation temperature. Distilled vapors with or without steam passed overhead to condensing coils and the condensate therefrom passed to a separator in which water was separated from the purified oil. The latter was then added to the main portion of the absorption oil.

Another process in the advancement of the art consisted in continuously diverting a small proportion of a contaminated absorption oil, either rich or lean, from the main stream and subjecting this diverted portion to direct contact with the same heating medium used in the stripping still. The quantity of heating medium required was only that necessary to vaporize the absorbent from the residual foreign matter. The absorbent vapors and heating medium were then conducted into the main stripping still in which the said vaporous absorbent and heating medium expended their heat content in stripping the absorbed constituents from the main body of rich absorption oil, and by this procedure the small portion of purified absorption oil was returned to the absorption oil without loss of heat. By this process, the small quantity of oil being distilled was heated to a relatively high temperature, and frequently because of the relatively high distillation temperature, chemical reaction occurring in the oil being distilled, especially toward the end of the distillation, necessitated withdrawal of relatively large amounts of bottoms, making the overall absorption oil loss abnormally large.

I have discovered a process for purifying absorption oils by distillation of a small fraction of the oil at a relatively low temperature, thereby overcoming the above-mentioned objection. To carry out my invention I remove a small portion of the enriched or fat absorption oil from the main stream. The latter is then passed into the stripping still, as conventionally, on the top tray or it may be added to the still several trays below the top. In case I add the said main body of fat oil to the stripper several trays below the top tray, I then add the said small separated portion of the fat oil to the same stripping column on the top tray. By this procedure the main portion of absorbed natural gasoline which is freed from the absorbent by the stripping operation passes through the very small portion of absorption oil in the top several trays. In other words, the very large volume of still vapors greatly reduces the partial pressure of the much smaller volume of oil vapor, thus reducing the partial vapor pressure of the liquid. In an attempt to establish equilibrium, vaporization from the said upper trays takes place until the partial pressure of the vapor and the partial vapor pressure of the liquid are equalized. Hence the desirable front end portion of the absorption oil will be vaporized and carried with the main stripping still vapors overhead and thence to the dephlegmator. In this dephlegmator condensation and separation of the distilled absorption oil from the gasoline vapors occur. The purified condensed oil is then removed from the dephlegmator as bottoms and returned to the main absorption oil stream while the uncondensed overhead vapors pass to a conventional gasoline condensing and separating apparatus. The residual oil from the purification step is drained from the bottom purifying plate to an accumulator from which it may be intermittently or continuously removed, as desired.

An object of this invention is to provide a continuous absorption oil purification process.

Another object of this invention is to provide a continuous absorption oil purification process which is simple and economical in operation.

Still another object of this invention is to provide a process whereby an absorption oil may be continuously purified or continuously maintained in a purified condition without interference with the absorption plant operation.

Yet another object of this invention is to provide a continuous process whereby an absorption oil may be purified and maintained in a purified condition by distillation with the consumption of no additional heat or steam over that required for normal stripper operation.

Figure 2:
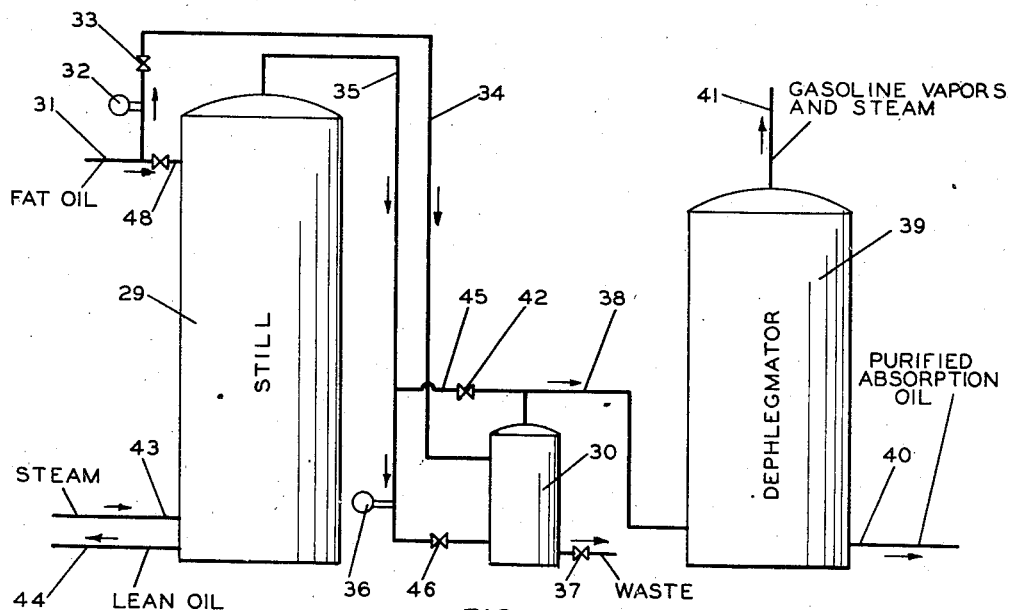

Still other objects and advantages of my invention will be evident to those skilled in the art from a careful study of the following disclosure in which Figure 1 shows one form of apparatus in which my invention may be carried out, the stripping and purifying apparatus being arranged in one unit, and Figure 2 shows another form of apparatus in which my invention may be practiced, the stripping and purifying apparatus are two separate and distinct pieces of equipment.

Referring now to Figure 1 of the drawing, numeral 11 represents a conventional stripping apparatus and is composed of two sections, the larger, represented by numeral 12, and the smaller by numeral 13. The said larger section is essentially a conventional stripping apparatus while the upper or smaller section is a distillation apparatus. Line 14 brings rich absorption oil from an absorber, not shown, to my apparatus, line 15 is a branch line for conducting a portion of this feed from the main feed line 14 into the top of the purification or distillation section 13 of the tower 11. The flowmeter 16 indicates the flow through this branch line, the rate of flow being controlled by valve 17, which may be manually or automatically controlled, as desired.

Apparatus or tower 18 is a dephlegmator tower of the usual type, and may well be of bubble cap design. Line 19 connects the top of the purifier 13 with the bottom of the dephlegmator 18. Line 28 conducts gasoline vapors from the dephlegmator 18 to the gasoline condenser, not shown. Purified or reclaimed absorption oil is withdrawn from the dephlegmator through line 20.

Tray 24 in the purifier section 13 of the primary tower 11 is a takeoff tray of conventional design, the takeoff line 23 leading into the accumulator 22. Line 21 is a pressure equalizer line connecting the vapor space over the takeoff tray 24 and the accumulator 22. Line 25 permits withdrawal of the accumulated waste from said accumulator.

Line 26 leads steam into the stripping section of the primary tower for stripping of the absorbed gasoline vapors from the enriched absorption oil. Stripped absorption or lean oil is removed through line 27 to exchangers and coolers, not shown, previous to reuse in an absorber.

Referring to Figure 2, numeral 29 refers to a stripper or stripping tower. This tower may be a bubble cap tower, or may be packed with other forms of packing or contact material such as to promote intimate contact between the countercurrently flowing fluids, for example liquid flowing downward and vapor passing upward. Line 31 leads rich absorption oil into the stripping tower 29, while line 44 conducts stripped or lean absorbent from the stripper. Stripping steam enters through steam line 43, while the stripping steam and stripped vapors leave by way of vapor line 35 and are conducted thereby into the lower portion of purifier apparatus or tower 30. The flow of this vapor stream may be metered, if desired, by meter 36. Line 34 connects the main rich oil inlet line 31 and purifier 30, and is equipped with flow meter 32 and flow control valve 33. Line 37 conducts the waste or residue from the purifier to storage or other disposal, as desired.

Line 38 connects the top of the purifier 30 with the lower section of the dephlegmator 39, which dephelgmator is essentially the same as the dephlegmator 18 of Figure 1. Dephlegmator bottoms are withdrawn through line 40 and added to the main portion of lean absorption oil for further use. Line 41 carries the overhead vapors from the dephlegmator to the gasoline condensers, not shown. Line 45 is a by-pass connecting vapor line 35 with vapor line 38. The flow of vapors through this by-pass line may be regulated or controlled by the manipulation of valves 46 and 42, which control may be manual or automatic as desired.

In the operation of my process, when using the apparatus shown in Figure 1, the rich absorption oil from an absorber, not shown, enters the system by way of line 14, and the major portion of this oil, say as much as 99% or even more, passes directly into the top of the stripper section 12 of the main tower 11 through feed line 47. Takeoff tray 24 may be considered as the dividing line between the said stripping section 12 and the purifying section 13 of the primary tower 11.

The remaining very small portion of the rich absorption oil stream which comprises from say ½% to 1% of the total flow is by-passed from line 14 through line 15 and enters the top of the purifying section 13. The rate of flow of this rich oil through line 15 is measured by flow meter 16 and controlled by valve 17, which latter may be manually or automatically operated, as desired. Takeoff tray 24 is not equipped with a downspout so that all liquid leaving this tray as liquid is withdrawn through takeoff line 23 and delivered into the small receiver or accumulator 22. Stripping agent, such as steam, enters the stripper through line 26, and passes upward through said stripper. In so doing, the absorbed gasoline hydrocarbons are distilled or stripped from the absorption oil. Thus a mixture of stripped gasoline hydrocarbon vapors and steam leaves the stripping section 12 and passes upward through the purifying section 13. The main function of said stripping section 12 is to remove dissolved gasoline from the absorbent; and it is intended or contemplated to add sufficient steam to the stripper from line 26 so that the lean absorption oil issuing from the stripper through line 27 is essentially free of dissolved or absorbed gasoline hydrocarbons. When adding this amount of steam to the stripper, upon reaching the top stripper tray, the upward passing vapors comprising gasoline vapors and steam are not in equilibrium with the absorption oil, that is, the partial pressure of the absorption oil in the vapors over this top stripper tray is less than the partial vapor pressure of the absorption oil under the same conditions of temperature and pressure. Since the said partial pressure of the absorption oil is not as great as its possible equilibrium value under the conditions existing on the top stripper tray, these vapors on passing upward through the very small amount of rich absorbent in the purifier section 13 of the tower vaporizes more absorption oil and the vapors issuing from the top of the purifier 13 through line 19 contain a larger proportion of absorption oil in the vapor form than do the vapors on the top tray of the stripper. This increase in the amount of vaporous absorption oil is then the amount of liquid absorption oil distilled from the upper (purifier) section of the tower.

These overhead vapors passing through line 19 are led to the bottom of the dephlegmator 18 in which the heat balance is so adjusted as to cause condensation of only the absorption oil vapors. The remaining gasoline vapors and steam pass from the dephlegmator by line 28 and are conducted to condensers, fractionator or stabilizers, etc., all of which apparatus is conventional and therefore not shown. The dephlegmator condensate or bottoms comprises distilled and purified absorption oil, and this is withdrawn through line 20 and returned to the main lean oil stream previous to heat exchange and cooling.

The dephlegmator 18 is essentially a bubble cap column or other column suitable for the purpose of separating the absorption oil from the vapor stream.

The liquid remaining on the takeoff tray 24 of column 11 is the heavy ends from the very small fraction of absorption oil which had been diverted from the main stream. These heavy ends contain heavy polymers, tar-like materials and other compounds which detract from the efficiency of absorption oils, as well as mechanical dirt, rust, scale, etc. This impure material is removed from the tray 24 by line 23 and accumulated in accumulator 22, from which it may be removed for disposal as desired. Line 21 connects the accumulator 22 with the vapor space over tray 24 for pressure equalization purposes.

In the operation of my process when using the apparatus as shown in Figure 2, rich absorption oil from the absorber and heat exchangers, not shown, enters the system by the fat oil line 31. The main portion, as for example 99 or 99½% of this fat oil stream passes directly into the stripper tower 29. This fat oil then flows down the tower and in countercurrent contact with upflowing stripping steam. This steam enters by way of steam line 43. An excess of steam is added over that required to obtain equilibrium on the top stripper tray with respect to the fat absorption oil. These vapors, containing some absorption oil vapor but mainly stripped gasoline vapors and steam, pass from the top of the stripper and are conducted by line 35 into the bottom of the purifier 30. The rate of flow of these vapors is controlled by valve 46 and measured by meter 36. The valve 46 may be a manually or automatically controlled valve, as desired.

A very small fraction of the rich absorption or fat oil from line 31 bypasses stripper 29 and is conducted through bypass line 34 to the top of the purifier 30. This bypassed rich oil then flows downward over bubble trays in said purifier 30, and in countercurrent relation to the steam, absorption oil and gasoline vapors from vapor line 35. The rate of flow of this bypassed fat oil may be measured by meter 32 and is controlled by valve 33, which similar to valve 46, may be manually or automatically operated, as desired. These said vapors on contacting the fat oil in the purifier, strip therefrom its gasoline content and the more volatile portion of the absorption oil, leaving as a purifier residue or bottoms the less volatile portion of the bypassed absorption oil. These bottoms are similar to those removed from the purifier takeoff tray 24 of Figure 1 and contain gummy and tar-like material and other high boiling constituents not desired in absorption oils, along with mechanical dirt, such as rust, scale and sediment. This latter undesirable material is removed from the purifier by line 37 and disposed of as desired.

The overhead vapors from the purifier 30 containing steam, gasoline, and absorption oil vapors, and substantially in equilibrium with the fat oil entering the top of the purifier, pass through vapor line 38 into the dephlegmator 39, which is similar to dephlegmator 18 of Figure 1. In this dephlegmator the absorption oil vapors condense and the condensate is removed through line 40 as purified absorption oil. The uncondensed overhead vapors pass from the dephlegmator by way of line 41 to gasoline condensers, etc., not shown.

In case the entire amount of stripper vapors is not needed for the absorption oil vaporization in the purifier 30, a portion thereof may bypass the said purifier by opening valve 42 in line 45 and partially closing valve 46 in line 34. The main body of stripped or lean absorption oil is withdrawn from the stripper by lean oil line 44, and the purified absorption oil from line 40 is added, the combined stream cooled by exchangers and/or coolers and passed to an absorber, not shown.

In Figure 1 the partial pressure of the absorption oil in the ascending vapors over the top stripper tray (point of inlet of enriched absorption oil) is less than the equilibrium vapor pressure of the absorption oil at the existing conditions of temperature and pressure, while on the top tray of the purifier section, the partial pressure of the absorption oil in the ascending vapors is substantially equal to the equilibrium vapor pressure of the absorption oil (at the point of inlet of the small portion of enriched absorption oil and at substantially the same conditions of temperature and pressure as in the top tray of the stripper), and therefore vaporization of absorption oil has taken place in the purifier section of the main tower.

In Figure 2 substantially the same partial pressure and vapor pressure relations exist in the top of the stripper tower and in the top of the purifier tower, as explained above in relation to the combined apparatus of Figure 1. Thus evaporation or distillation of the actual absorption oil occurs in the herein disclosed purifiers, by passing a very large amount of vapors containing steam not in equilibrium with the absorption oil, through a very small portion of the same absorption oil whereby equilibrium is substantially obtained resulting in absorption oil vaporization or distillation, and therefore purification.

Applicant does not wish to be limited by any explanation or theory of the above operation, but only by the appended claims.

The towers, strippers, purifier and dephlegmators shown and described herein, have been described as bubble cap towers for convenience, but applicant does not wish to be restricted to the use of this type of equipment, since other types of contactor packing may be used satisfactorily, providing contact between the countercurrently flowing materials be efficient. The meters, valves, etc., may be standard equipment, and may be inserted at many points in the apparatus to assist in the efficient control and operation of the process.

While I have described two embodiments of my invention as represented by Figures 1 and 2, I do not wish to limit my invention thereby, since many variations and modifications may be made and yet remain within the intended scope and spirit of my invention.

What I claim is:

1. A process for purifying used absorption oil comprising the steps of passing a major portion of a stream of hot enriched absorption oil containing absorbed gasoline hydrocarbons to a stripping still, passing steam in countercurrent relation to the major portion of the hot enriched absorption oil in said still for removal of the absorbed gasoline hydrocarbons to produce a lean absorption oil and a stream of steam and gasoline hydrocarbon vapors; passing a minor portion of said stream of hot enriched absorption oil containing absorbed gasoline hydrocarbons to a purifier, passing the above said stream of steam and gasoline hydrocarbon vapors in countercurrent relation with said minor portion of the enriched absorption oil in said purifier whereby the absorbed gasoline hydrocarbons and the more volatile portion of the absorption oil are vaporized and pass out as a combined stream of steam, gasoline hydrocarbon vapors and absorption oil vapors, the less volatile portion of the absorption oil remaining as purifier bottoms, removing said purifier bottoms as waste material; passing said combined stream of steam, gasoline hydrocarbon vapors and absorption oil vapors to a dephlegmator wherein the absorption oil vapors are condensed to form a purified absorption oil, removing this purified absorption oil and combining same with the stream of lean absorption oil from the above said still; and removing the remaining steam and gasoline hydrocarbon vapors from the dephlegmator.

2. A process for purifying used absorption oil comprising the steps of passing a major portion of a stream of hot enriched absorption oil containing absorbed gasoline hydrocarbons to a stripping still, passing steam in countercurrent relation to the major portion of the hot enriched absorption oil in said still for removal of the absorbed gasoline hydrocarbons to produce a lean absorption oil and a stream of steam and gasoline hydrocarbon vapors; passing a minor portion of said stream of hot enriched absorption oil containing absorbed gasoline hydrocarbons to a purifier, passing the above said stream of steam and gasoline hydrocarbon vapors in countercurrent relation with said minor portion of the enriched absorption oil in said purifier whereby the absorbed gasoline hydrocarbons and the more volatile portion of the absorption oil are vaporized and pass out as a combined stream of steam, gasoline hydrocarbon vapors and absorption oil vapors, the less volatile portion of the absorption oil remaining as purifier bottoms, removing said purifier bottoms as waste material; passing said combined stream of steam, gasoline hydrocarbon vapors and absorption oil vapors to a dephlegmator wherein the absorption oil vapors are condensed to form a purified absorption oil, removing this purified absorption oil and combining same with the stream of lean absorption oil from the above said still; and removing the remaining steam and gasoline hydrocarbon vapors from the dephlegmator; the amount of steam passed into said still being in excess of that required to produce equilibrium conditions between the stream of steam, gasoline hydrocarbon vapors and absorption oil vapors, and the major portion of the hot enriched absorption oil at its point of inlet into the still.

3. A process for purifying used absorption oil comprising the steps of passing a major portion of a stream of hot enriched absorption oil containing absorbed gasoline hydrocarbons to a stripping still, passing steam in countercurrent relation to the major portion of the hot enriched absorption oil in said still for removal of the absorbed gasoline hydrocarbons to produce a lean absorption oil and a stream of steam and gasoline hydrocarbon vapors; passing a minor portion of said stream of hot enriched absorption oil containing absorbed gasoline hydrocarbons to a purifier, passing the above said stream of steam and gasoline hydrocarbon vapors in countercurrent relation with said minor portion of the enriched absorption oil in said purifier whereby the absorbed gasoline hydrocarbons and the more volatile portion of the absorption oil are vaporized and pass out as a combined stream of steam, gasoline hydrocarbon vapors and absorption oil vapors, the less volatile portion of the absorption oil remaining as purifier bottoms, removing said purifier bottoms as waste material; passing said combined stream of steam, gasoline hydrocarbon vapors and absorption oil vapors to a dephlegmator wherein the absorption oil vapors are condensed to form a purified absorption oil, removing this purified absorption oil and combining same with the stream of lean absorption oil from the above said still; and removing the remaining steam and gasoline hydrocarbon vapors from the dephlegmator; the amount of steam passed into said still being in excess of that required to produce equilibrium conditions between the stream of steam, gasoline hydrocarbon vapors and absorption oil vapors, and the major portion of the hot enriched absorption oil at its point of inlet into the still, and said amount of steam being substantially that required to produce equilibrium conditions between the stream of steam, gasoline hydrocarbon vapors and absorption oil vapors, and the minor portion of the hot enriched absorption oil at its point of inlet into the purifier.

4. A process for purifying used absorption oil comprising the steps of passing a major portion of a stream of hot enriched absorption oil containing absorbed gasoline hydrocarbons to a stripping still, passing steam in countercurrent relation to the major portion of the hot enriched absorption oil in said still for removal of the absorbed gasoline hydrocarbons to produce a lean absorption oil and a stream of steam and gasoline hydrocarbon vapors; passing a minor portion of said stream of hot enriched absorption oil containing absorbed gasoline hydrocarbons to a purifier, passing the above said stream of steam and gasoline hydrocarbon vapors in countercurrent relation with said minor portion of the enriched absorption oil in said purifier whereby the absorbed gasoline hydrocarbons and the more volatile portion of the absorption oil are vaporized and pass out as a combined stream of steam, gasoline hydrocarbon vapors and absorption oil vapors, the less volatile portion of the absorption oil remaining as purifier bottoms, removing said purifier bottoms as waste material; passing said combined stream of steam, gasoline hydrocarbon vapors and absorption oil vapors to a dephlegmator wherein the absorption oil vapors are condensed to form a purified absorption oil, removing this purified absorption oil and combining same with the stream of lean absorption oil from the above said still; and removing the remaining steam and gasoline hydrocarbon vapors from the dephlegmator; the amount of steam passed into said still being in excess of that required to produce equilibrium conditions between the stream of steam, gasoline hydrocarbon vapors and absorption oil vapors, and the major portion of the hot enriched absorption oil at its point of inlet into the still, and said amount of steam being substantially that required to produce equilibrium conditions between the stream of steam, gasoline hydrocarbon vapors and absorption oil vapors, and the minor portion of the hot enriched absorption oil at its point of inlet into the purifier, wherein the major portion of the hot enriched absorption oil is more than 99% of said absorption oil, and the minor portion being less than 1% of said absorption oil.

CHARLES O. MEYERS.